(12) United States Patent
Lee

(10) Patent No.: US 8,061,697 B1
(45) Date of Patent: *Nov. 22, 2011

(54) WHEEL WITH ROTARY SHOCK ABSORBER

(76) Inventor: Raymond J. Lee, South San Francisco, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 12/544,976

(22) Filed: Aug. 20, 2009

(51) Int. Cl.
*B60G 11/14* (2006.01)

(52) U.S. Cl. ........ 267/272; 267/275; 267/285; 267/199; 267/203; 188/290

(58) Field of Classification Search ............. 188/290; 267/199, 200, 202, 203, 156, 272, 273, 275, 267/284, 285; 280/286
See application file for complete search history.

(56) References Cited

U.S. PATENT DOCUMENTS

| | | | | |
|---|---|---|---|---|
| 581,918 | A | * | 5/1897 | Pope .......................... 280/286 |
| 2,443,900 | A | * | 6/1948 | Evans ......................... 301/133 |
| 2,544,924 | A | * | 3/1951 | Herold ........................ 105/170 |
| 2,683,033 | A | * | 7/1954 | Ashburn ...................... 267/272 |
| 7,566,050 | B1 | | 7/2009 | Lee |

* cited by examiner

*Primary Examiner* — Xuan Lan Nguyen
(74) *Attorney, Agent, or Firm* — Ray K. Shahani; Kin H. Lai

(57) ABSTRACT

A rotatable wheel having a rotary shock absorber coupled on an axle and between a disc brake rotor and the rotatable wheel, for providing enhanced suspension. The rotary shock absorber consists of an air-tight hollow disc structure filled with lubricant, the disc structure further having a central circular opening, a sealing plate coupled to and sealing the central circular opening on one side, a sealing boot portion coupled and sealing the central circular opening on the other side, and a circular hub portion nesting inside the hollow disc structure. The hub portion further has six circular through holes, one or more identical helical springs nested firmly inside each of the six circular through holes, and six lug bolts each having two threaded ends and a smooth body. Each of the six lug bolts is further coupled rigidly and perpendicularly at the center of each of the two corresponding helical springs and secured on both ends at each side of the hollow disc structure.

9 Claims, 10 Drawing Sheets

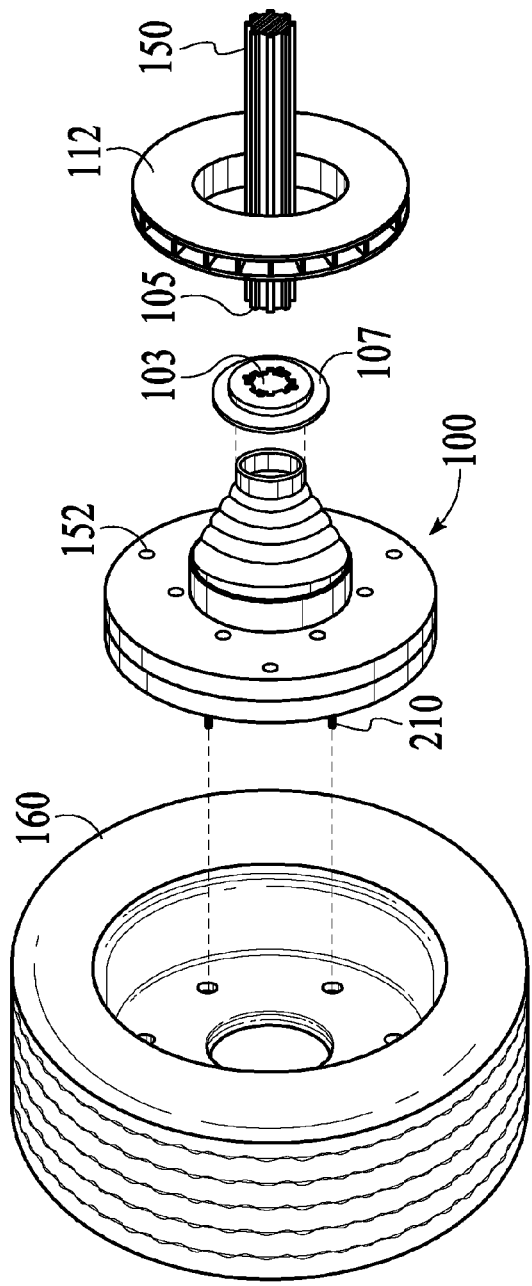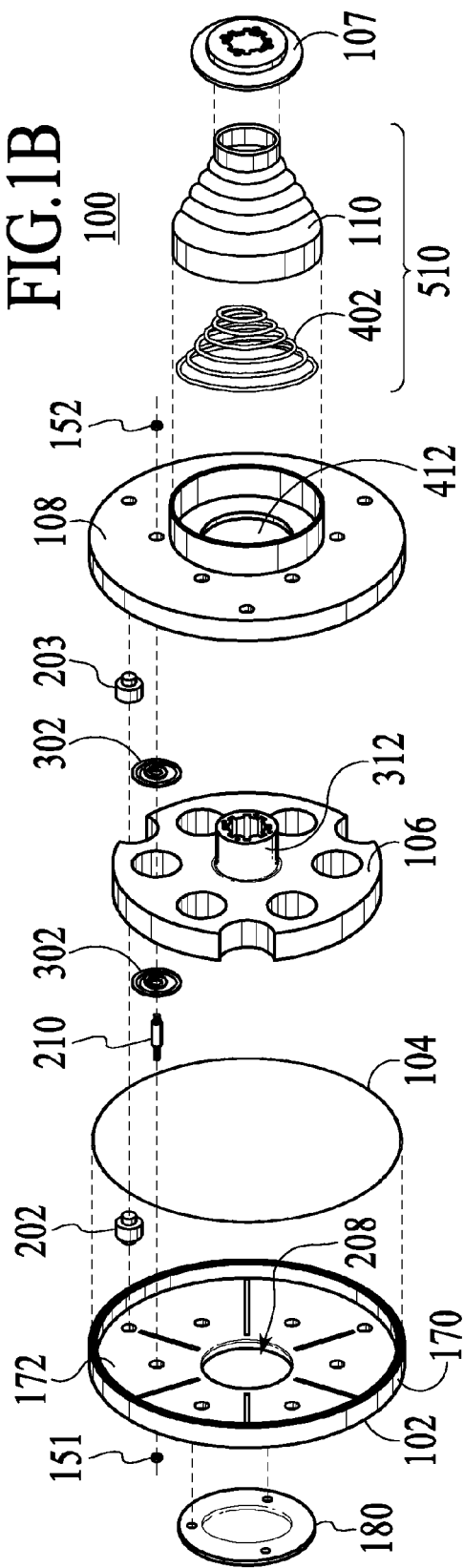

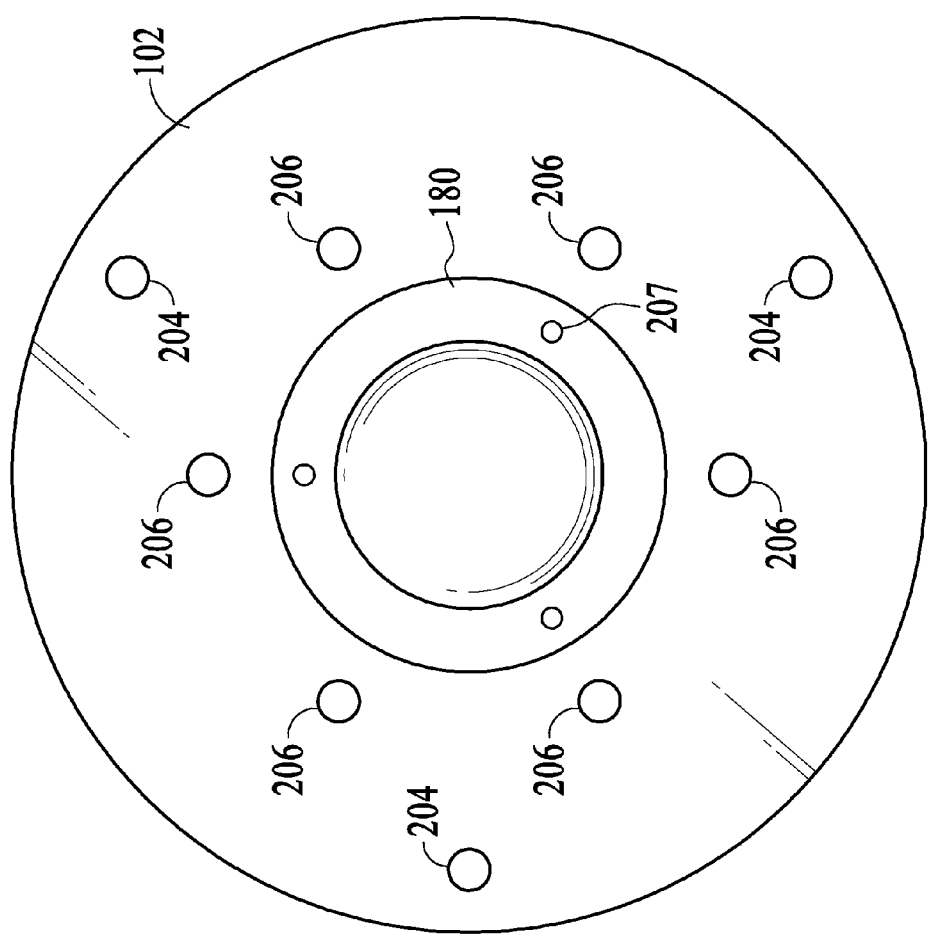

WHEEL WITH ROTARY SHOCK ABSORBER

RELATED APPLICATIONS

This application is related to U.S. patent application Ser. No. 12/054,199 filed Mar. 24, 2008, issued Jul. 28, 2009 as U.S. Pat. No. 7,566,050, entitled ROTARY SHOCK ABSORBER, which is incorporated herein by reference in its entirety, and claims any and all benefits to which it is entitled therefrom.

FIELD OF THE INVENTION

This invention relates to wheels of equipment and vehicles including bicycles and motor vehicles, and more particularly to a helical spring operated shock absorbing system that reduces shock and vibrations experienced during operation of such equipment and vehicles.

BACKGROUND OF THE INVENTION

The wheel, one of the five basic machines of mankind, is defined as being "a solid disk or a rigid circular ring connected by spokes to a hub, designed to turn around an axle passed through the center." The wheel, as described, existed this way for millennia and, while indispensable, was inefficient because it was susceptible to rapid wear and deterioration from both friction caused by the surfaces of the disk and axle rubbing together as the wheel turned and by shock and vibration caused by the wheel traveling over rough, uneven surfaces. It was in 1794 that Welsh inventor and carriage maker Philip Vaughan patented the roller bearing which, when used in the wheel, was the first fundamental improvement to it because it virtually eliminated friction and its inherent damage. Nevertheless, the wheel, now made immeasurably more efficient by the use of the roller bearing, was still susceptible to damage caused by shock and vibration.

In general, bicycle suspension refers to the system or systems used to suspend riders and all or part of the bicycles in order to protect them from the roughness of the terrain over which they travel. Besides providing obvious rider comfort, suspension mechanisms improve both safety and efficiency while keeping one or both wheels in contact with the ground and allowing the rider's mass to move over the ground in a flatter trajectory. Bicycle suspension can be implemented in a variety of ways:
- Suspension of the front fork and front wheel
- Stem-mounted suspension
- Suspension of the seat post
- Rear-wheel suspension Additionally, combinations of the above can be provided. Bicycles with suspension front forks and rear suspensions are referred to as full suspension bikes.

One of the most common automotive suspension systems of the prior art utilizes front and rear shock absorbers such as compression springs to suspend the weight of the vehicle. The suspension springs used on shock absorbers in typical cars and trucks are constructed in a variety of types, shapes, sizes, rates, and capacities, including leaf springs, coil springs, air springs, and torsion bars. These suspension springs are used in sets of four for each vehicle, or they may be paired off in various combinations and attached by any of several different mounting systems and techniques. The suspension system has two basic functions, to keep the wheels of rolling equipment or a vehicle in firm, direct contact with the road surface and to provide a comfortable ride. Under normal conditions, the springs of the shock absorbers support the body of the car evenly by compressing and rebounding with every up-and-down movement. This up-and-down movement, however, causes bouncing and swaying after each bump and is very uncomfortable. These undesirable effects are reduced by one or more shock absorbers.

The rotary shock absorber of the present invention is a device which can be installed directly on the wheels of rolling equipment, bicycles and automobiles to facilitate absorption of shock and vibrations as they travel on the road.

U.S. Pat. No. 581,918 published May 1897 to Pope, U.S. Pat. No. 2,443,900 published June 1948, U.S. Pat. No. 2,544,924 published March 1951 to Herold Walter F. and U.S. Pat. No. 2,683,033 published July 1954 to Glenn Ashburn Roby disclose the use of helical springs for suspension system and/or coupling of shock absorber to other part of a vehicle. They however did not teach the configuration and structure of the present invention and the coupling of a rotary shock absorber to a functional wheel.

ADVANTAGES AND SUMMARY OF THE INVENTION

The present invention is a device and method to enhance the efficiency of shock absorption of rolling equipment, bicycles and other motor vehicles and ultimately improving comfort and safety of riders.

One object of the present invention is to provide a compact, light weight shock absorber assembly which will not affect the overall weight of the rolling equipment, bicycles or motor vehicles.

Another object of the present invention is direct application and easy installation of the rotary shock absorber system to the wheels of rolling equipment, bicycles and other vehicles. Also, the suspension system of the present invention will have no affect on intricate or complex design of the rolling equipment, bicycles and motor vehicles.

Yet another object of the present invention is to provide all-in-one suspension wheels to rolling equipment, bicycles and other vehicles, which also eliminates the need for installing separate suspension system or strengthens existing suspension system.

Yet another object of the present invention is to provide a rotatable wheel having an integrally coupled rotary shock absorber.

Yet another object of the present invention is to provide a compact suspension system for equipment, bicycles and other vehicles.

BRIEF DESCRIPTION OF THE DRAWINGS

FIG. 1A is a representative side isometric view of an embodiment of the rotary shock absorber 100 of the present invention.

FIG. 1B is an exploded view of an embodiment of the rotary shock absorber 100 of the present invention.

FIG. 2B is a representative top view of an embodiment of outer plate 102 and axle bore cover plate 180 of the rotary shock absorber 100 of the present invention.

DETAILED DESCRIPTION OF THE PREFERRED EMBODIMENT

Figure 2A:
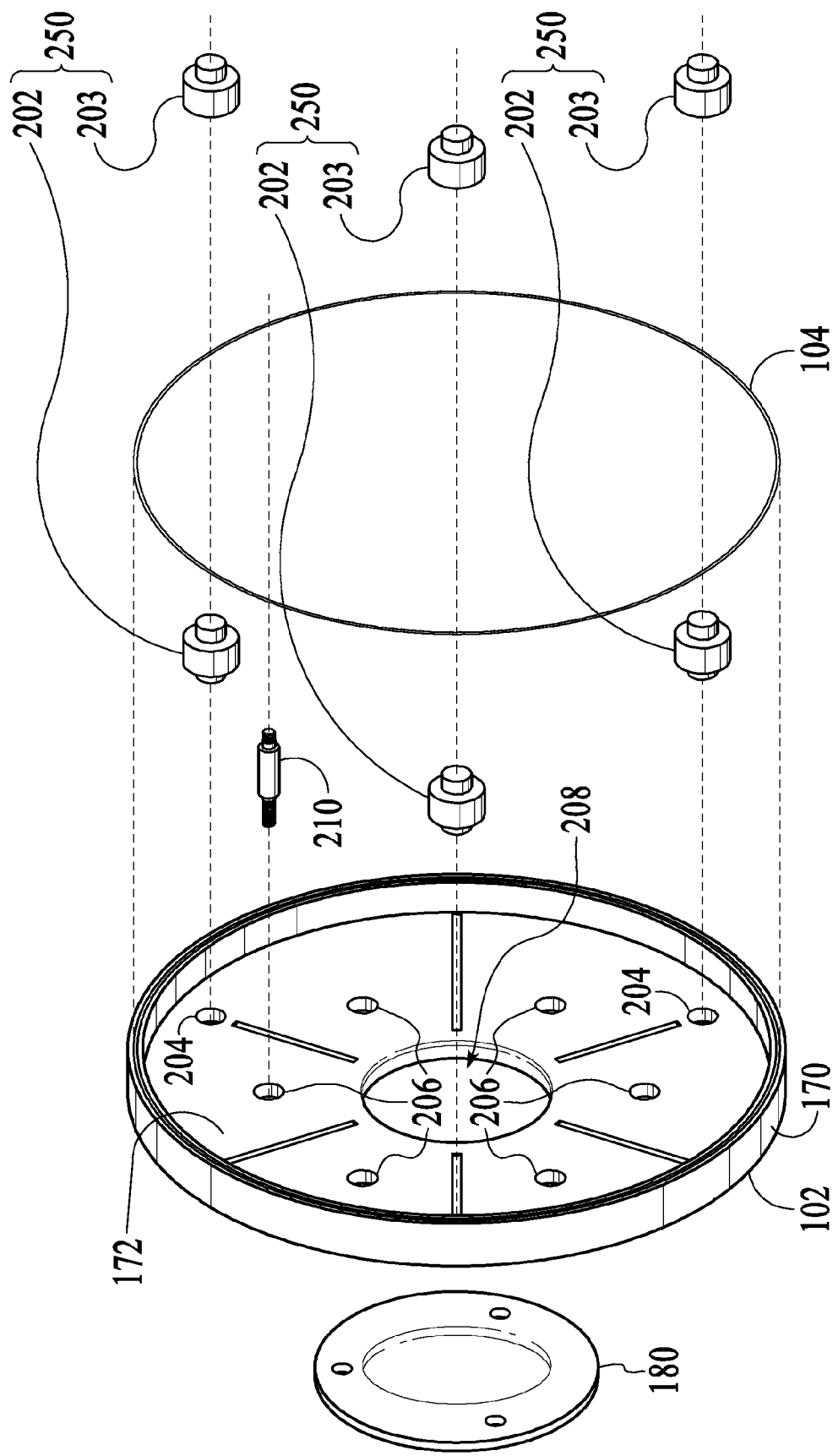
FIG. 2A is an exploded view of an embodiment of outer plate 102 of the rotary shock absorber 100 of the present invention.

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

It will be understood that in the event parts of different embodiments have similar functions or uses, they may have been given similar or identical reference numerals and descriptions. It will be understood that such duplication of reference numerals is intended solely for efficiency and ease of understanding the present invention, and are not to be construed as limiting in any way, or as implying that the various embodiments themselves are identical.

FIG. 1A is a representative side isometric view of an embodiment of the rotary shock absorber 100 of the present invention. As shown in FIG. 1A, when the rotary shock absorber 100 of the present invention is assembled, it takes the shape of a flat disc with retaining plate axle bore 109 and axle bore 308 that open to the axle 150 of either rolling equipment, a bicycle or a motor vehicle. In one embodiment, the internal cavity of rotary shock absorber 100 is filled with lubricant and the entire structure of rotary shock absorber 100 must be air tight to prevent contamination by dust and moisture and leakage of lubricant filled inside. The main functions of lubricant are to lubricate moving parts and help dissipate and absorb shock and vibration during the running of the vehicle. As shown in FIG. 1A, rotary shock absorber 100 of the present invention is installed between the wheel 160 and disc brake rotor 112. As shown in FIG. 1A, both the rotary shock absorber 100 and disc brake rotor 112 ride on and are driven by the axle 150. In one embodiment, a splined slot pattern 103 on retaining plate axle bore 109 and axle bore 308 of the present invention match and interconnect with the splines 105 on the axle 150. As shown in FIG. 1A, rotary shock absorber 100 is bolted to the wheel 160 by a plurality of connecting lug bolts (not shown) mounted through holes 210, and subsequently drives the wheel 160. The rotary shock absorber 100 of the present invention can be a replacement or an additional suspension device to an existing suspension system.

FIG. 1B is an exploded view of an embodiment of the rotary shock absorber 100 of the present invention. The rotary shock absorber 100 consists essentially of outer plate 102, hub 106, inner plate 108 and seal assembly 510 and the entire structure of rotary shock absorber 100 of the present invention is sealed at both ends by axle bore cover plate 180 at outer plate 102 and seal assembly retaining plate 107 at seal assembly 510 respectively. In one embodiment, outer plate 102 and inner plate 108 are bolted together by three sets of plate lock assemblies 250. Hub 106 sits inside the plate lock assemblies 250, which further comprise a male plate lock 202 and a female plate lock 203. The assemblies 250 are held together with six connecting lug bolts 210, or more or less. In one embodiment, hub nose 312 will extend through hub nose opening 412 of inner plate 108, causing the entire seal assembly 510 and its tip to extend beyond seal assembly opening 550 of rubber boot 110. In one embodiment, seal assembly retaining plate 107 is fastened on hub nose 312 outside of rubber boot 110 in order to seal the entire rotary shock absorber 100 from the outside.

As best shown in FIG. 1A, the rotary shock absorber 100 of the present invention is installed to the wheel 160 of any rolling equipment, bicycle or motor vehicle at the outer plate 102 with six connecting lug bolts 210, or more or less. Hub 106 of rotary shock absorber 100 further contains a number of helical shock absorbing springs 302 which offset and dampen vibrations created when rolling wheels 160 are in contact with rough and uneven surfaces.

FIG. 2A is an exploded view of an embodiment of outer plate 102 of the rotary shock absorber 100 of the present invention. FIG. 2B is a representative top view of outer plate 102 and axle bore cover plate 180 of the rotary shock absorber 100. As shown in FIG. 2A, outer plate 102 takes the shape of a shallow dish with a flat circular base 172, a shallow side rim 170 and a axle bore hole 108 in the center. The outer plate 102 is divided equally and radially in six sections by six lubrication channels 190, or more or less. In one embodiment, lubrication channels 190 are grooves which have an approximate dimension of about 1/8 inch or more or less wide and about 1/8 inch or more or less deep and their main function is to allow lubricant within the structure of rotary shock absorber 100 to flow freely to the surfaces on the hub 106 as it rides between the inner plate 108 and outer plate 102 when the equipment or vehicle is moving. In each section, there is one wheel lug hole 206. As best shown in FIG. 2A, an O-ring 104 that is made of flexible, elastic material such as plastic is placed around the perimeter of outer plate 102. The purpose of O-ring 104 is to prevent leakage of lubricant at the seal between outer plate 102 and inner plate 108 after they are bolted together by connecting lug bolts 210 and secured into a locking position by three plate lock assemblies 250.

As best shown in FIGS. 2A and 2B, axle bore hole 208 is sealed from the outside by axle bore cover plate 180. The purpose of the axle bore hole 108 is to provide access to the hub 106 where the tip of axle 150 is fastened to hub 106. The axle bore hole 108 is sealed during operation of rotary shock absorber 100 by axle bore cover plate 180. As best shown in FIGS. 2A and 2B, axle bore cover plate 180 is a circular plate that has an surface area larger than axle bore hole 108. In one embodiment, axle bore cover plate 180 is attached to seal and cover the entire axle bore hole 108 by a plurality of sealing screws 207.

In one embodiment, each wheel lug hole 206 is a complete through hole that has an internal diameter matching the outside diameter of the longer threaded ends 352 of connecting lug bolts 210. The purpose of wheel lug holes 206 is to provide anchor points to secure connecting lug bolts 210 in position and to secure the angular position of the entire rotary shock absorber 100 on the wheel 160. As best shown in FIG.

3C, both ends of the elongated connecting lug bolts 210 are threaded with one of the threaded ends 352 longer than the other 350. The middle section 354 of connecting lug bolts 210 is smooth and has a slightly larger diameter than both ends 352 and 350. In one embodiment, the longer threaded ends 352 of each of the six connecting lug bolts 210 are secured at their respective wheel lug holes 206 on the outer plate 102. The length L of the longer threaded end 352 of connecting lug bolts 210 must be larger than the thickness of outer plate 102 such that the longer threaded end 352 of connecting lug bolts 210 completely passes through wheel lug holes 206 and emerges on the outer surface of outer plate 102. As best shown in FIG. 1B, the longer threaded end 352 of connecting lug bolts 210 is locked in position by outer plate securing nut 151. Thus, the longer threaded end 352 of connecting lug bolts 210 extend beyond outer plate securing nut 151 and will then be further fastened mechanically on wheel 160.

Figure 3A:
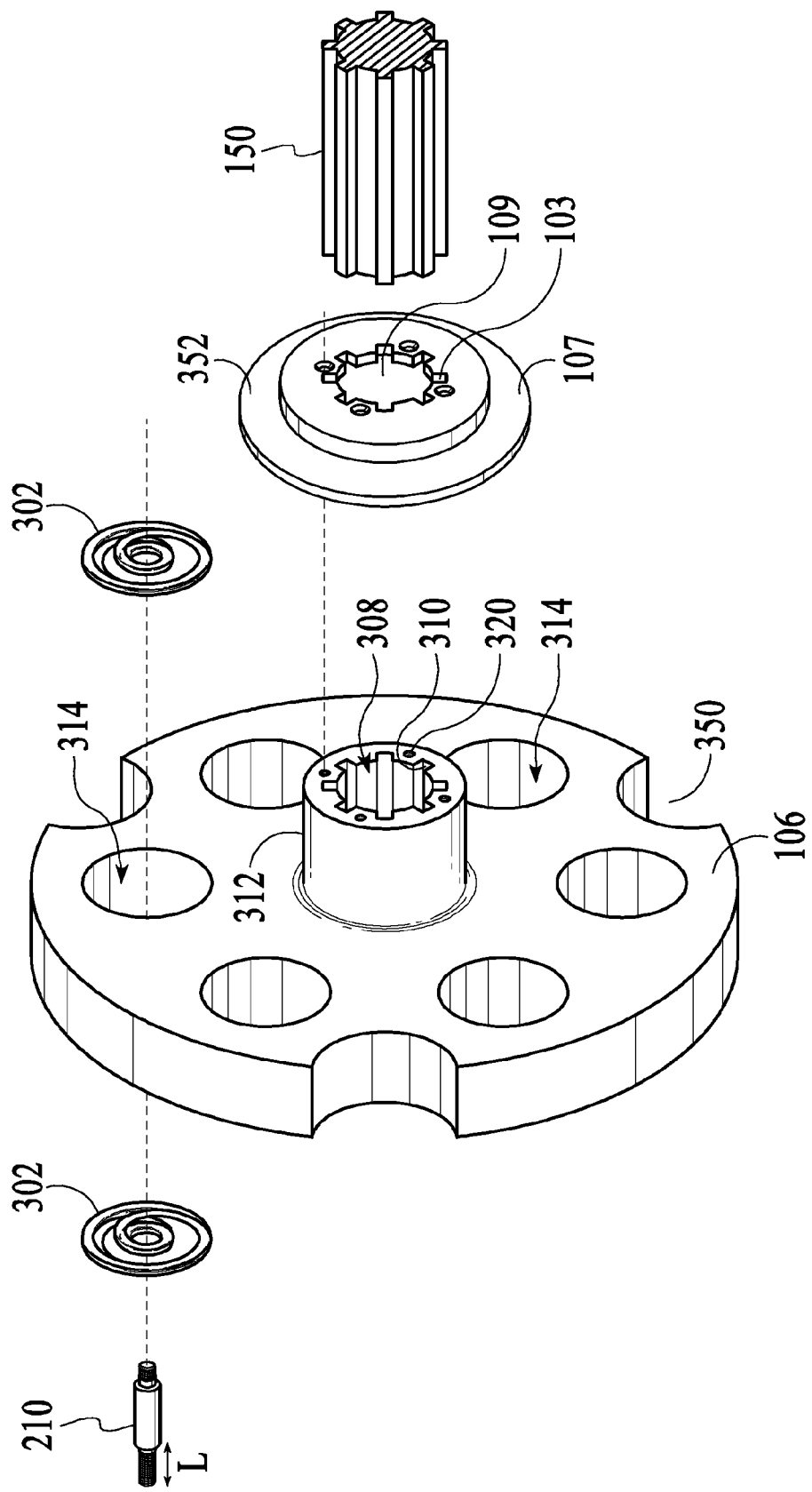
FIG. 3A is an exploded view of an embodiment of hub 106 of the rotary shock absorber 100 of the present invention.

FIG. 3A is an exploded view of an embodiment of hub 106 of the rotary shock absorber 100 of the present invention. Hub 106 is a circular disc with a hub nose 312 at the center. In one embodiment, crescent or other shaped openings 350 are carved out to reduce the weight of hub 106 as well as to accommodate three sets of plate lock assemblies 250 when inner plate 102 and outer plate 108 are bolted together by connecting lug bolts 210 during assembly. As best shown in FIG. 1B, hub 106 should fit snugly inside the cavity created by outer plate 102 and inner plate 108 with hub nose 312 extending through hub nose opening 412 on inner plate 108 and eventually the entire sealing assembly 550. The seal assembly retaining plate 107 is then fastened to hub nose 312 and locked in position outside rubber boot 110. In one embodiment, seal assembly retaining plate 107 has a retaining plate axle bore 109 that is shaped to match and align with axle bore 308 on hub nose 312 and the cross sectional shape of axle 150 and flat skirt portion 352. A function of seal assembly retaining plate 107 is to secure seal assembly 510 in position on rotary shock absorber 100.

In one embodiment, axle bore 308 is a through hole positioned in the center of hub nose 312. As shown in FIG. 3A, axle bore 308 has spline slots 310 which match the cross-sectional shape of axle 150 of the motor vehicles upon which the rotary shock absorber 100 is installed. As best shown in FIGS. 1A and 1B, the tip of the hub nose 312 of hub 106 is covered by seal assembly retaining plate 107. During installation, axle 150 is inserted inside the hub nose 312 through seal assembly retaining plate 107 until axle 150 reaches the bottom of axle bore 308. The tip of axle 150 is then fastened mechanically on hub 106 to prevent it from falling off during operation of the axle 150. With the axle 150 secured in place on the hub 106 through axle bore 308 and matching spline slots 310, the hub 106 and subsequently the entire rotary shock absorber 100 will be driven and rotate in unison with the axle 150.

As shown in FIG. 3A, there are six spring housings 314 which are essentially through holes with internal diameter slightly smaller than the outer diameter of helical shock absorbing springs 302 to ensure a tight fit. A single or multiple helical shock absorbing springs 302 nest with a snug fit within each spring housing 314. The overall shock absorbing efficiency of the rotary shock absorber 100 of the present invention increases as more helical shock absorbing springs are 302 used.

Figure 3C:
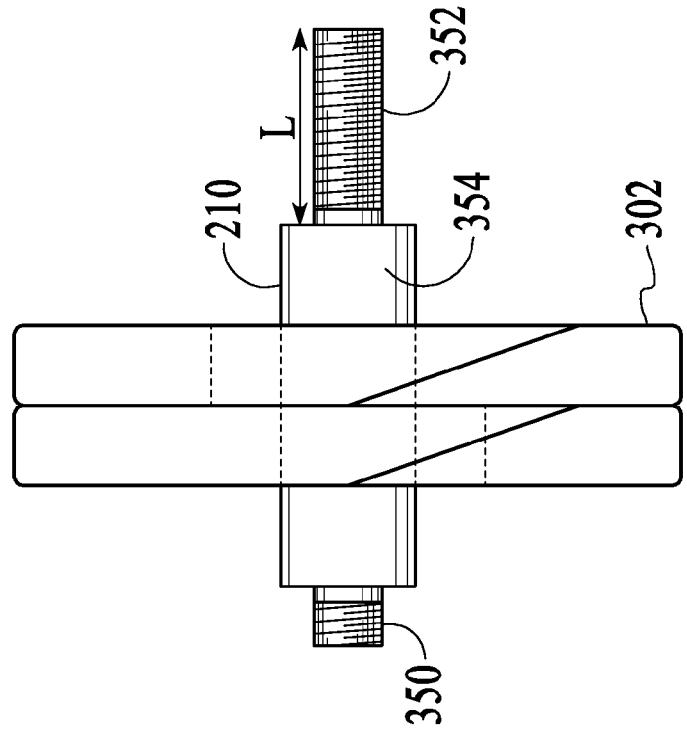
FIGS. 3B and 3C are respective representative top and side view of an embodiment of helical shock absorbing springs 302 of the rotary shock absorber 100 of the present invention.
Figure 3B:
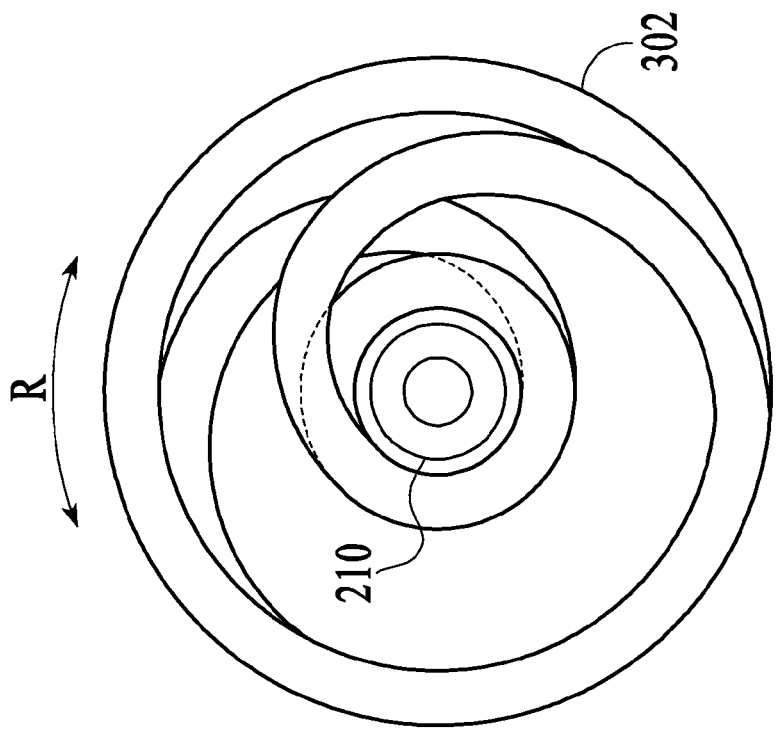

FIGS. 3B and 3C are representative top and side views, respectively, of helical shock absorbing springs 302 of the rotary shock absorber 100 of the present invention. As best shown in FIG. 3B, helical shock absorbing springs 302 are flat springs shaped in the spiral of Archimedes. The Spiral of Archimedes is defined by the locus of points corresponding to the locations over time of a point moving away from a fixed point with a constant speed along a line which rotates with constant angular velocity. Equivalently, in polar coordinates (r, θ) it can be described by the equation:

$$r = a + b\theta$$

with real numbers a and b. Changing the parameter a will turn the spiral, while b controls the distance between successive turnings.

Since helical shock absorbing springs 302 are flat, two helical shock absorbing springs 302 can be stacked together. In one embodiment, stacking a plurality of helical shock absorbing springs 302 will increase stiffness of the entire rotary shock absorber 100 of the present invention. As best shown in FIGS. 3A and 3B, connecting lug bolts 210 go through the center of helical shock absorbing springs 302 until springs 302 sit on the middle section 354 of connecting lug bolts 210. As best shown in FIG. 3C, both ends of the elongated connecting lug bolts 210 are threaded with one of the threaded ends longer than the other. The middle section 354 of connecting lug bolts 210 is smooth and has a slightly larger diameter than both threaded ends 350 and 352. As shown in FIG. 3B, the center portions 354 of helical shock absorbing springs 302 wrap very tightly on the lug bolts 210 such that there is no relative rotation R between lug bolts 210 and helical shock absorbing springs 302. It will be understood that the two components rotate and revolve with the axle 150 of the equipment or vehicle in complete unison.

As best shown in FIG. 2A, the longer threaded end 352 of each of the six connecting lug bolts 210 are secured at their respective lug holes 206 on the outer plate 102 and secured in position by securing nuts 151. In one embodiment, connecting lug bolts 210 extend beyond securing nuts 151 and are further fastened to the rotating wheel 160. When the hub 106 and eventually the entire rotary shock absorber 100 is spinning in unison with axle 150, the rotation will ultimately drive wheels 160 through six connecting lug bolts 210 that are fastened on the wheels 160. When the wheels 160 are going over rough and uneven surfaces and vibrations are created, the vibrations will pass along from the wheels 160 to the helical shock absorbing springs 302 via connecting lug bolts 210 and be absorbed therein. Vibrations and shocks are dissipated and dampened by the plurality of helical shock absorbing springs 302, consequently providing suspension for rolling equipment and motor vehicles. As best shown in FIG. 1B, the shorter threaded end 350 of connecting lug bolts 210 pass through each of the six wheeling holes 406 on inner plate 108 and then are fastened into place by nut 152.

Figure 3D:
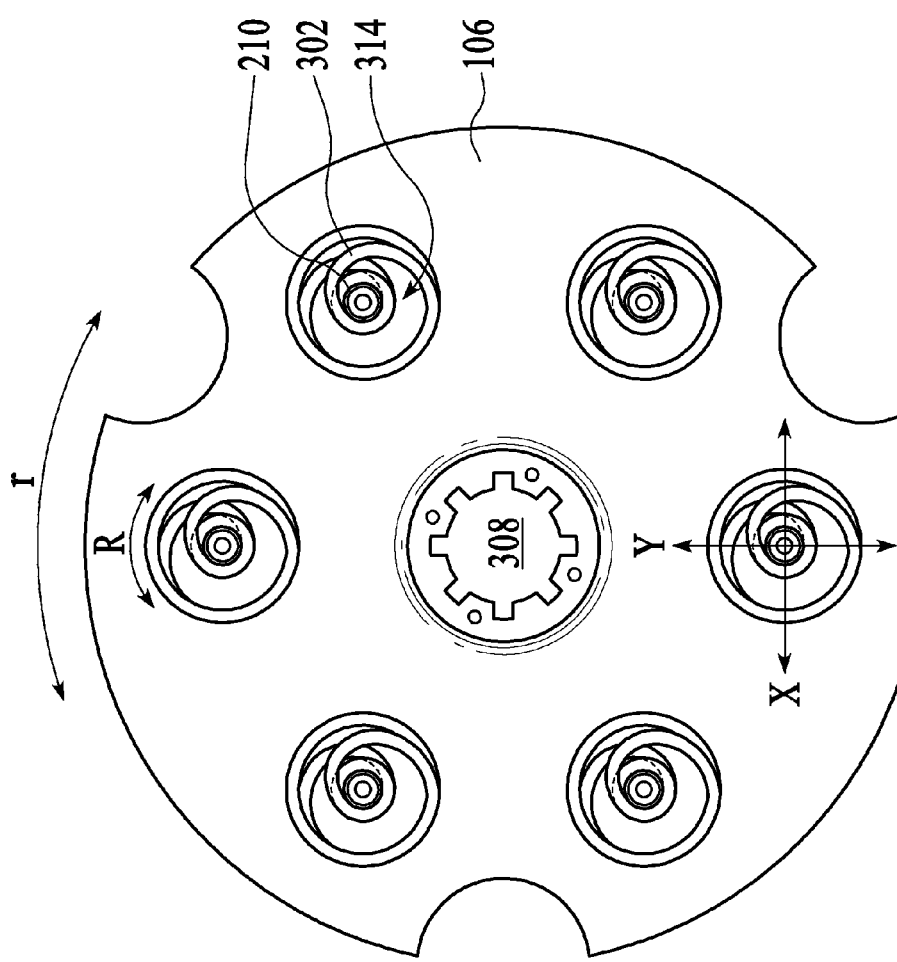
FIG. 3D is a representative top view of an embodiment of hub 106 of the rotary shock absorber 100 of the present invention with helical shock absorbing springs 302 installed.

FIG. 3D is a representative top view of an embodiment of hub 106 of the rotary shock absorber 100 of the present invention with helical shock absorbing springs 302 installed. As shown in FIG. 3D, helical shock absorbing springs 302 nested very tightly inside each of the six housings 314 while six connecting lug bolts 210 pass through each of their corresponding sets of helical shock absorbing springs 302. While the vehicle or bicycle is running, its axle 150 will turn in direction r. Since the axle 150 passes through axle bore 308 and is fastened rigidly at hub 106, the rotary shock absorber 100 of the present invention will also rotate in direction r in unison with the axle 150. In one embodiment, there will be no relative rotation R between connecting lug bolts 210 and helical shock absorbing springs 302. When wheels 160 are going over rough surfaces, vibrations and shocks will be generated. Since wheels 160 are fastened to the rotary shock absorber 100 of the present invention by six connecting lug bolts 210, connecting lug bolts 210 will be oscillating in directions X and Y and those oscillations/vibrations will be dampened by helical shock absorbing springs 302 and dissipated through the surrounding lubricant (not shown). As a result, shocks and vibrations transmitted to the rest of the equipment will be reduced. Since there are six sets of connecting lug bolts 210 and helical shock absorbing springs 302 assemblies distributed evenly around the entire perimeter of hub 106, or more or less, the arrangement ensures shocks generated by wheels 160 are constantly absorbed during running of the axle 150 in direction r.

Figure 4:
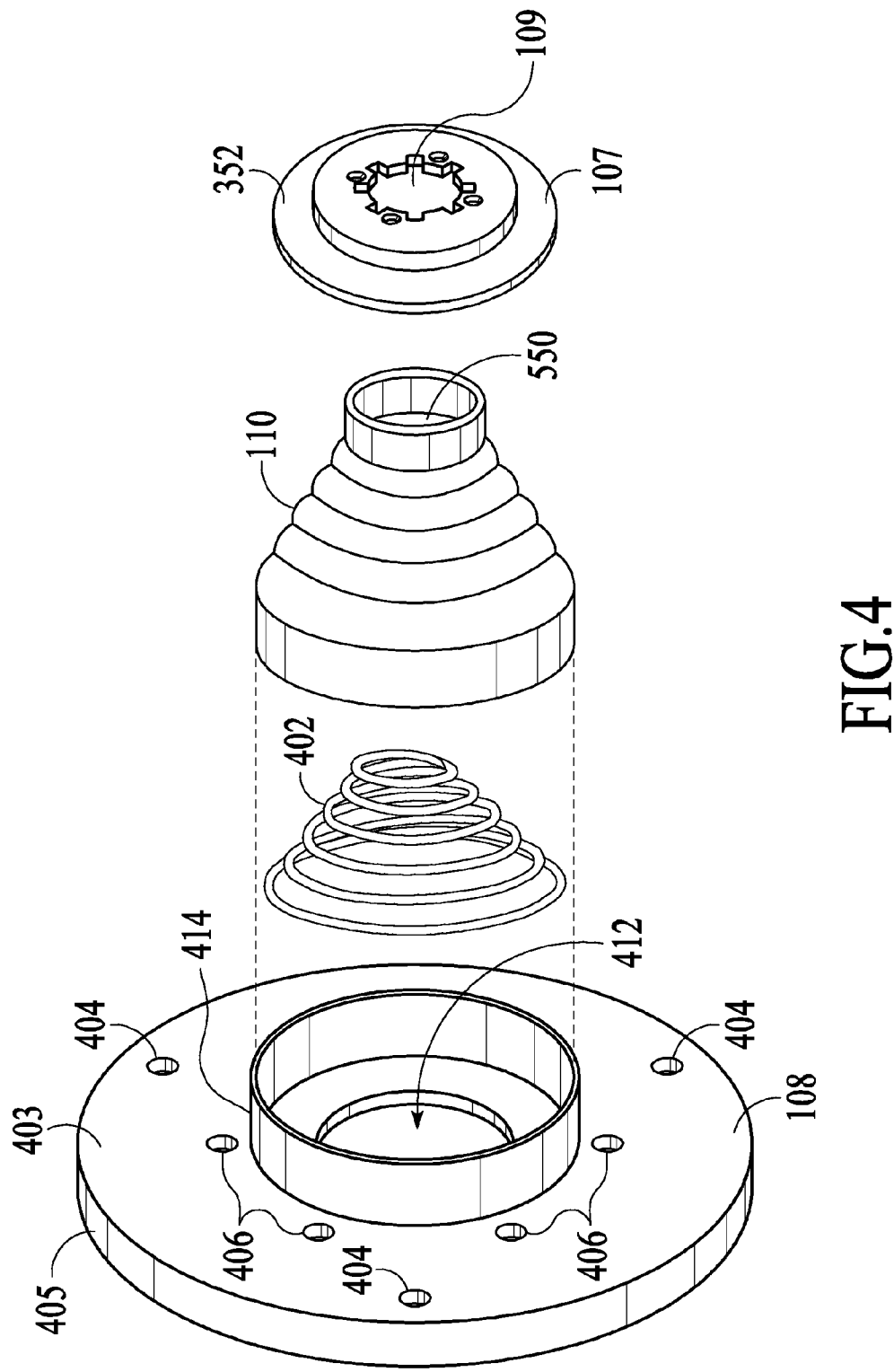
FIG. 4 is an exploded view of an embodiment of inner plate 108 and seal assembly 510 of the rotary shock absorber 100 of the present invention.

FIG. 4 is an exploded view of an embodiment of inner plate 108 and seal assembly 510 of the rotary shock absorber 100 of the present invention. The structure of inner plate 108 is similar to outer plate 102 which takes the shape of a shallow dish with a flat circular base 403 with a hub nose opening 412 and a shallow side rim 405. The inner plate 108 is divided equally and radially in six sections and in each section, there is one wheeling hole 406. In one embodiment, each wheeling hole 406 is a complete through hole and has an internal diameter large enough to accommodate a shorter threaded end 350 of connecting lug bolts 210. The purpose of wheeling holes 406 is to provide anchor point to secure connecting lug bolts 210 in position such that there is no relative rotation between hub 106, inner plate 108 and outer plate 102. As best shown in FIG. 1B, connecting lug bolts from inner plate 108 to outer plate 102 positioned at securing holes on inner plate 406 are secured by three sets of plate lock assemblies 250.

As shown in FIG. 4, inner plate 108 has a flange 414 on the outside surface to accommodate seal assembly 510. In one embodiment, seal assembly 510 further consists of sealing spring 402 and rubber boot 110. The main function of seal assembly 510 is provide a complete seal of the entire rotary shock absorber 100 of the present invention. Sealing spring 402 is in the form of a volute spring, which is a conical compression spring with a wider base and narrower top. Rubber boot 110 is a hollow conical structure with two open ends, one end wider than the other. The wide base of rubber boot 110 fits tightly within the rim of flange 414. In one embodiment, the entire sealing spring 402 fits inside the hollow rubber boot 110 with its flat wider base sitting inside flange 414 and its flat narrower top pushing against the narrow top open end of rubber boot 110, the seal assembly opening 550. In one embodiment, when rubber boot 110 is fitted on flange 414 of inner plate 108, sealing spring 402 should be slightly compressed radially to keep rubber boot 110 tightly in place inside flange 414. When the rotary shock absorber 100 is assembled, as best shown in FIG. 1, hub nose 312 will extend through hub nose opening 412 on inner plate 108. Subsequently, hub nose 312 will continue to extend through the sealing spring 402 until its tip is outside the seal assembly opening 550 of rubber boot 110. As shown in FIG. 4, seal assembly retaining plate 107 is a cap with a flat skirt portion 352 and a retaining plate axle bore 109 that matches the axle bore 308. In one embodiment, seal assembly retaining plate 107 is fastened at the tip of hub nose 312 outside seal assembly opening 550. A function of seal assembly retaining plate 107 is to enclose the entire rotary shock absorber 100 from the outside and provide a matching opening for the axle 150. When seal assembly retaining plate 107 is fastened, it should create a lateral compression on sealing spring 402 such that sealing spring 402 is constantly pushing towards the seal assembly retaining plate 107, henceforth producing a complete seal of the rotary shock absorber 110.

Figure 5:
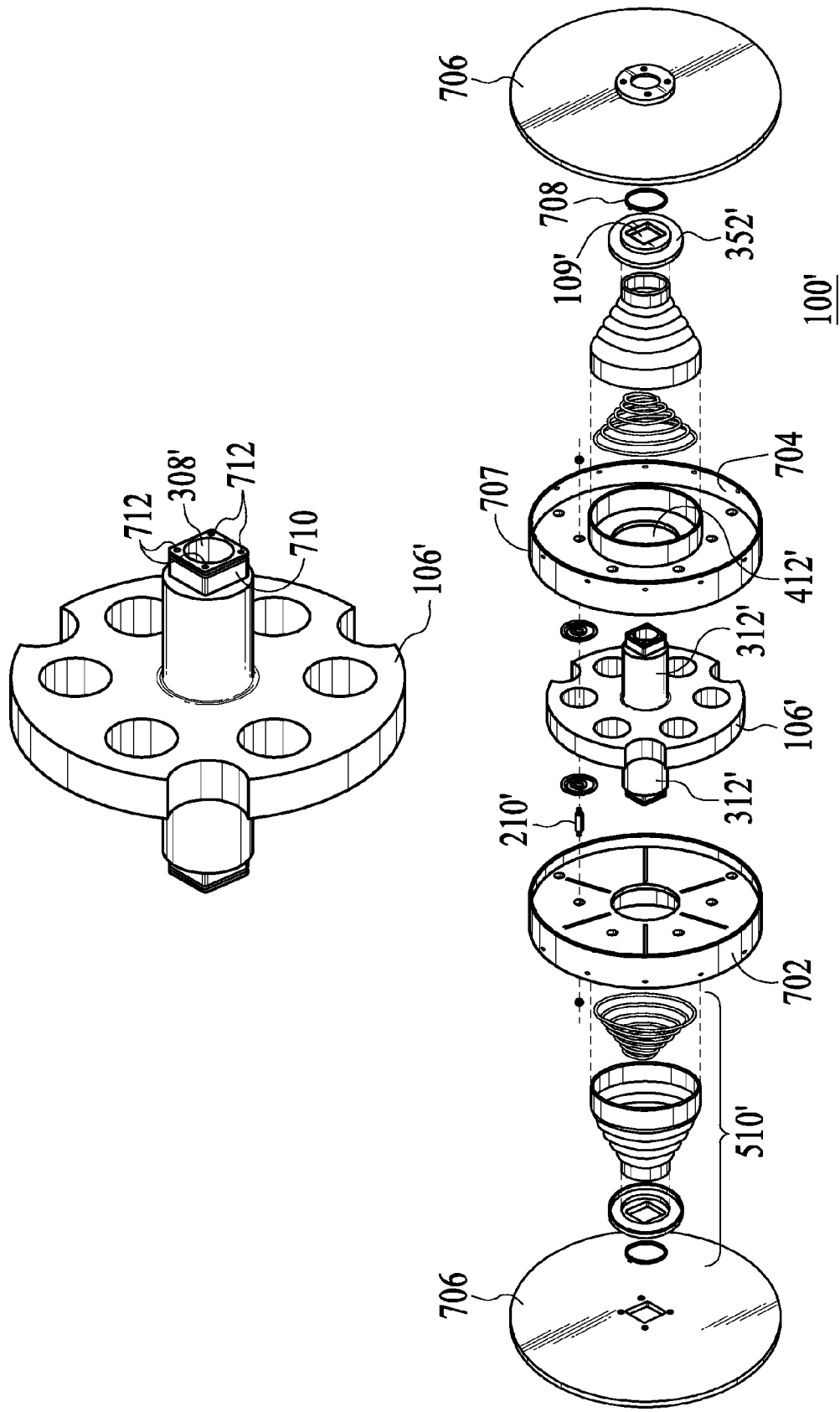
FIG. 5 is an exploded view of an alternative embodiment of the rotary shock absorber 100' of the present invention for bicycles.

FIG. 5 is an exploded view of an alternative embodiment of the rotary shock absorber 100' of the present invention for use on bicycles. In one embodiment, rotary shock absorber 100' of the present invention is installed at the center of a bicycle wheel where a regular bicycle wheel hub is usually located. Rotary shock absorber 100' rides on a bicycle axle (not shown) and between two bicycle disc brakes 706 of essentially any bicycle wheel system that uses disc brakes 706. In one embodiment, the bicycle disc brakes 706 are shield the rotary shock absorber 100' and prevent foreign objects from getting into the seal assembly 510'. The rotary shock absorber 100' can be a replacement or an additional suspension device to an existing suspension system.

As shown in FIG. 5, the rotary shock absorber 100' is a bilaterally symmetrical structure that consists essentially of two identical side plates 702, hub 106' and two identical seal assemblies 510' to seal the entire structure of rotary shock absorber 100' on both ends. Moreover, like the rotary shock absorber 100 adaptation for other rolling equipment and motor vehicles, the entire structure is air tight and filled with lubricant (not shown). Functionally, the rotary shock absorber 100' for bicycles is essentially the same as the rotary shock absorber 100 for motor vehicles.

Structurally, the major differences include:
Hub 106' has two identical hub noses 312' and the axle bore 308' is a through hole that the bicycle axle (not shown) completely passes through;
Two identical side plates 702 are structurally and functionally similar to the inner plate 108;
Sealed by identical seal assemblies 510' on both sides; and
Coupled to bicycle wheels along the side flange 704 of side plates 702.

In one embodiment, two side plates 702 are bolted together, by three sets of plate lock assemblies 250, with hub 106' nesting inside snugly. The system further comprises a male plate lock 202 and a female plate lock 203, and six connecting lug bolts 210', or more or less. In one embodiment, hub noses 312' will extend through hub nose openings 412' of side plates 702, subsequently the entire seal assembles 510' and their tips will extend beyond rubber boots 110. Seal assembly retaining plate 107' and snap ring 708 are fastened on hub nose 312' outside of rubber boot 110 in order to seal the entire embodiment of rotary shock absorber 100' from the outside. Side plate 702 has side flange 704 along its rim. Side flanges 704 provide anchor points for spokes of any bicycle wheel just like a regular hub shell.

In one embodiment, one end of all bicycle spokes (not shown) are firmly coupled to its corresponding spoke holes 707 on the side flange 704 on the side plates 702 of rotary shock absorber 100'.

In one embodiment, hub 106' is very similar to its motor vehicle adaptation, hub 106 as best shown in FIG. 3A except for the two hub noses 312' and axle bore 308' through hole instead. Hub 106' also consists essentially of helical shock absorbing springs 302 nested very tightly inside each of the six housings 314 while six connecting lug bolts 210' passing through each of their corresponding sets of helical shock absorbing springs 302. In one embodiment, both ends 350' of the elongated connecting lug bolts 210' are threaded and both threaded ends 350' have approximately equal length. The middle section 354' of connecting lug bolts 210' is smooth and has a slightly bigger diameter than both threaded ends 350'. The center of helical shock absorbing springs 302 wrap very tightly on the lug bolts 210' such that there is no relative rotation between lug bolts 210' and helical shock absorbing springs 302 and the two parts rotate and revolve with the bicycle axle (not shown) in complete unison. Spokes (not shown) of the bicycle wheel are fastened at spoke holes 707 on the side flange 704 on the side plates 702 of the present invention, such that while the bicycle wheels 600 (not shown) are going over rough surface, oscillations and vibrations will be transmitted via the spokes to the rotary shock absorber 100' and dampened by helical shock absorbing springs 302 and dissipated through the surrounding lubricant. As a result, shocks and vibrations transmitted to the rest of the bicycle (not shown) will be reduced. Since there are six sets of connecting lug bolts 210' and helical shock absorbing springs 302 assemblies distributed evenly around the entire perimeter of hub 106', or more or less, the arrangement ensures shocks generated are constantly absorbed.

In one embodiment, the length of hub noses 312' should be approximately 50% or more or less proportionally longer than its adaptation in motor vehicle hub nose 312. Additionally, the tip of hub nose 312' further comprises a square platform 710 with all four round corners. Each round corner features a snap ring groove 712 for coupling with snap ring 708. In one embodiment, hub noses 312' extend through the sealing spring 402 until square platform 710 is outside of rubber boot 110 of seal assemblies 510'. In one embodiment, seal assemblies 510' further consist of sealing spring 402 and rubber boot 110, retaining plate 107' and snap ring 708. The main function of seal assemblies 510' is to provide a complete seal of the entire rotary shock absorber 100' on both ends. As shown in FIG. 5, seal assembly retaining plate 107' is a cap with a flat skirt portion 352' and a retaining plate axle bore 109' that matches the square platform 710 of hub nose 312'. Square platform 710 passes through retaining plate axle bore 109' of seal assembly retaining plate 107'. Snap ring 708 is then attached and snapped onto square platform 710 of hub nose 312' and locked firmly by the four snap ring grooves 712 on the square platform 710. A function of seal assembly retaining plate 107' is to seal the entire rotary shock absorber 100' from the outside. In one embodiment, square platform 710 is further coupled to disc brakes of a bicycle. In the cases that disc brakes are not present on a bicycle, flat skirt portion 352' of seal assembly retaining plate 107' will be slightly modified and given a larger diameter so that it also provides protection for the seal assembly 510'.

Figure 6:
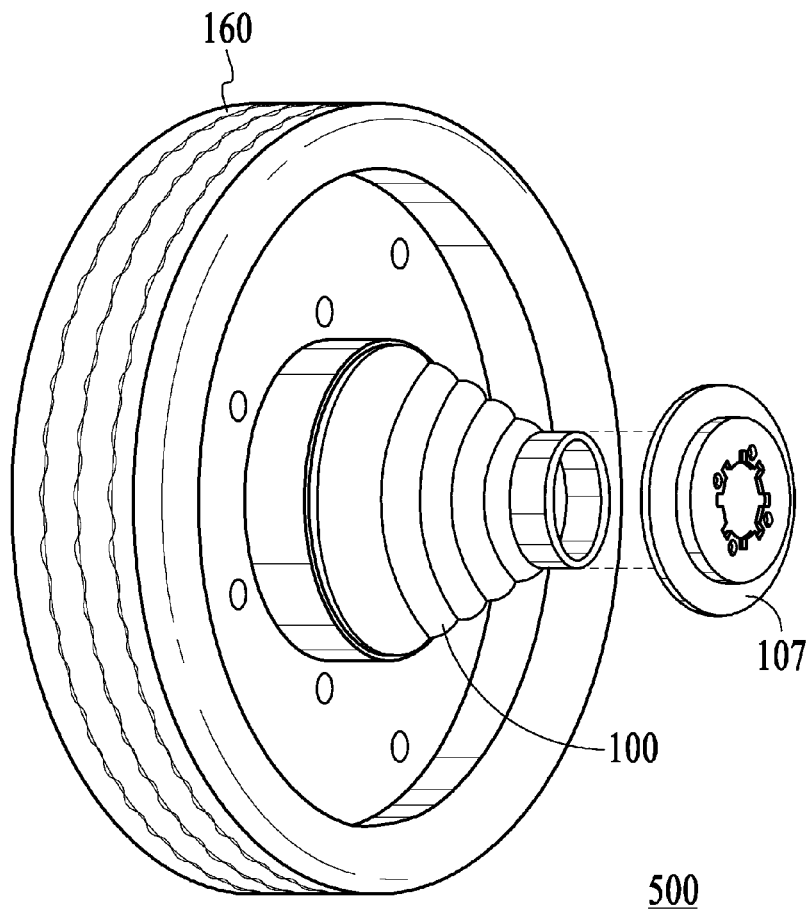
FIG. 6 is a representative side isometric view of an embodiment of the integrated rotary shock absorber wheel 500 of the present invention.

FIG. 6 is a representative side isometric view of an embodiment of the integrated rotary shock absorber wheel 500 of the present invention. In one embodiment, the present invention 500 is a new type of wheel, one that contains rotary shock absorber 100 as an integral part, or that integrated rotary shock absorber wheel 500 can be, and is, a wheel unto itself. As shown in FIG. 6, rotary shock absorber 100 is incorporated integrally to a motor vehicle wheel 160 to form the wheel with integrated rotary shock absorber 500. Users can simply install the integrated rotary shock absorber wheel 500 by installing axle 150 (not shown) of the motor vehicles through seal assembly retaining plate 107. In so doing, the integrated rotary shock absorber wheel 500 will be driven and will rotate in unison with the axle 150. The integrated rotary shock absorber wheel 500 of the present invention functions as a regular vehicle wheel with additional suspension performance.

Figure 7:
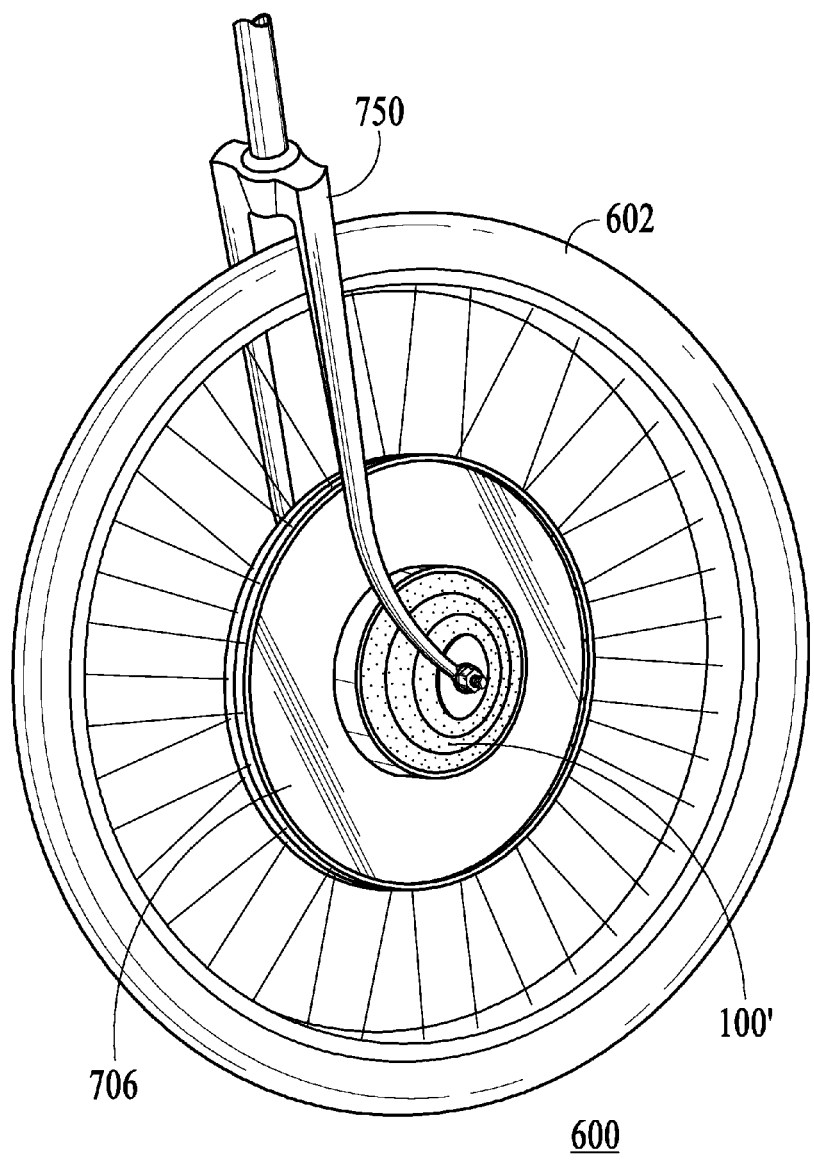
FIG. 7 is a representative side isometric view of an embodiment of the integrated rotary shock absorber wheel for bicycles 600 of the present invention.

FIG. 7 is a representative side isometric view of an embodiment of the integrated rotary shock absorber wheel for bicycles 600. As shown in FIG. 7, bicycles rotary shock absorber 100' is incorporated integrally onto bicycle wheel 602. The integrated rotary shock absorber wheel for bicycles 600 is installed between the two brake plates 706. Both sides of the integrated rotary shock absorber wheel for bicycles 600 are then coupled to the ends of the forks 750 mechanically. The integrated rotary shock absorber wheel for bicycles 600 of the present invention functions as a regular bicycles wheel with additional suspension performance. The integrated rotary shock absorber wheel for bicycles 600 of the present invention functions as a regular bicycles wheel with additional suspension performance.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A rotatable wheel having a rotary shock absorber coupled on an axle and between a disc brake rotor and the rotatable wheel, the rotary shock absorber comprising a hollow disc structure filled with lubricant, the disc structure having a central circular opening, a sealing plate coupled to and sealing the central circular opening on one side and a sealing boot portion coupled to and sealing the central circular opening on the other side, and a circular hub portion nesting smoothly and snugly inside the hollow disc structure, the hub portion having six circular through holes, at least one identical helical springs nested firmly inside each of the six circular through holes, six lug bolts each having two threaded ends and a smooth body, each of the six lug bolts coupled rigidly and perpendicularly at the center of each of the corresponding helical spring and secured on both ends at each side of the hollow disc structure.

2. A rotatable wheel having a rotary shock absorber coupled on an axle and between a disc brake rotor and the rotatable wheel, the rotary shock absorber comprising:
a circular outer plate portion, the outer plate portion having a flat circular base, a side rim, a central circular opening and a plurality of through holes, the central circular opening sealed by a circular sealing plate portion attached to the outside surface of the outer plate portion;
a circular inner plate portion, the inner plate portion having a flat circular base, a side rim, a central circular opening and a plurality of through holes correspondingly to the through holes on the outer plate portion, the inner plate portion coupled to the outer plate portion at their respective rims and fastened together mechanically to create an air-tight cavity, the inner plate portion further having a circular flange on an outside surface around the central circular opening;
a circular disc hub portion nesting inside the cavity between the outer plate portion and inner plate portion, the circular disc hub portion further having a plurality of circular through holes distributed evenly and a nose portion attached integrally and extending perpendicularly at its center, the nose portion further having a central hole having spline slot pattern corresponding a spline slot pattern on the axle of the rolling equipment, the nose portion extending outwardly and perpendicularly to the central circular opening in the inner plate portion;

a plurality of helical springs, each helical spring having an outside diameter slightly larger than the diameter of the circular through holes of the circular disc hub, each helical spring nesting firmly inside the circular through holes, each helical spring coupled rigidly to a lug bolt at the center, the lug bolts having a short threaded end, a long threaded end and a smooth body, the short threaded end coupled at one of the through holes on the inner plate and the longer threaded end coupled at the corresponding through hole on the outer plate, the longer threaded end further extending beyond the outer plate and coupled mechanically to the wheel; wherein vibrations created at the wheel are transmitted through the lug bolts and absorbed by the helical springs; and a sealing boot sitting inside the flange of the inner plate, the sealing boot comprising a conical compression spring and a hollow conical boot portion, the compression spring slightly compressed both radially and axially and nesting inside the conical boot portion for securing the sealing position of the conical boot portion on the flange, the nose portion of the hub further extending beyond the sealing boot perpendicularly and attached mechanically to a sealing plate portion outside the sealing boot, the sealing plate portion comprising a circular disc having a central keyed hole with spline slot pattern matching that of the axle, thereby providing a seal of the sealing boot and an opening to the axle.

3. The rotatable wheel of claim 2 in which the entire structure of the rotary shock absorber is sealed from the outside and the cavity is filled with lubricant.

4. The rotatable wheel of claim 2 in which the helical springs are flat and in the pattern of the spiral of Archimedes.

5. The rotatable wheel of claim 2 in which the quantity of the circular through holes is selected from the group consisting of two, four, six and eight.

6. The rotatable wheel of claim 2 in which the body of the lug bolts have a slightly larger diameter than the threaded ends thereof.

7. The rotatable wheel of claim 2 in which the seal between the inner plate portion and outer plate portion further has a circular sealing ring.

8. The rotatable wheel of claim 7 in which the circular sealing ring is an elastic seal providing complete seal between the inner plate portion and the outer plate portion.

9. A bicycle wheel having a rotary shock absorber coupled to the wheel for providing shock absorption, the rotary shock absorber comprising:

two identical circular side plate portions, the side plate portions having a flat circular base, a side rim, a central circular opening and a plurality of through holes, the side plate portions coupled to each other at their respective rims and locked together mechanically to create a cavity, each side plate portion further having a circular flange on the outside surface around the central circular opening, the side rim having a plurality of bicycle wheel spoke holes;

a circular disc hub portion nesting inside the cavity between the two identical side plate portions, the circular disc hub portion having a plurality of circular through holes distributed evenly and two identical nose portions attached integrally and extending perpendicularly and outwardly at its center, the nose portions each having a central hole corresponding to the outer diameter of the axle of a bicycle, the nose portions extending outward and perpendicular to the central circular opening in the side plate portions, the nose portions further having a square platform at their tips;

a plurality of helical springs, each helical spring having an outside diameter slightly larger than the diameter of the circular through holes of the circular disc hub and nesting firmly inside the circular through holes, wherein vibrations created at the wheel are transmitted to the plurality of helical springs and thereby dissipated, each helical spring coupled rigidly to a lug bolt at the center, the lug bolt each having two threaded ends and a smooth body, each threaded end coupled at one of the through holes on the side plate portions; and two identical sealing boots sitting inside the flange of each of the side plate portions, each sealing boot comprising a conical compression spring and a hollow conical boot portion, the compression spring slightly compressed both radially and axially and nesting inside the conical boot portion, thereby securing the sealing position of the conical boot portion inside and on the hub nose, each nose portion of the hub portion extending beyond the sealing boot perpendicularly and attached mechanically to a sealing plate portion outside of the sealing boot, the sealing plate portion comprising a circular disc having a central keyed hole matching the pattern of the square platform of the hub nose portion, thereby providing sealing for the boot and opening to the axle.

* * * * *